Figure 1A:
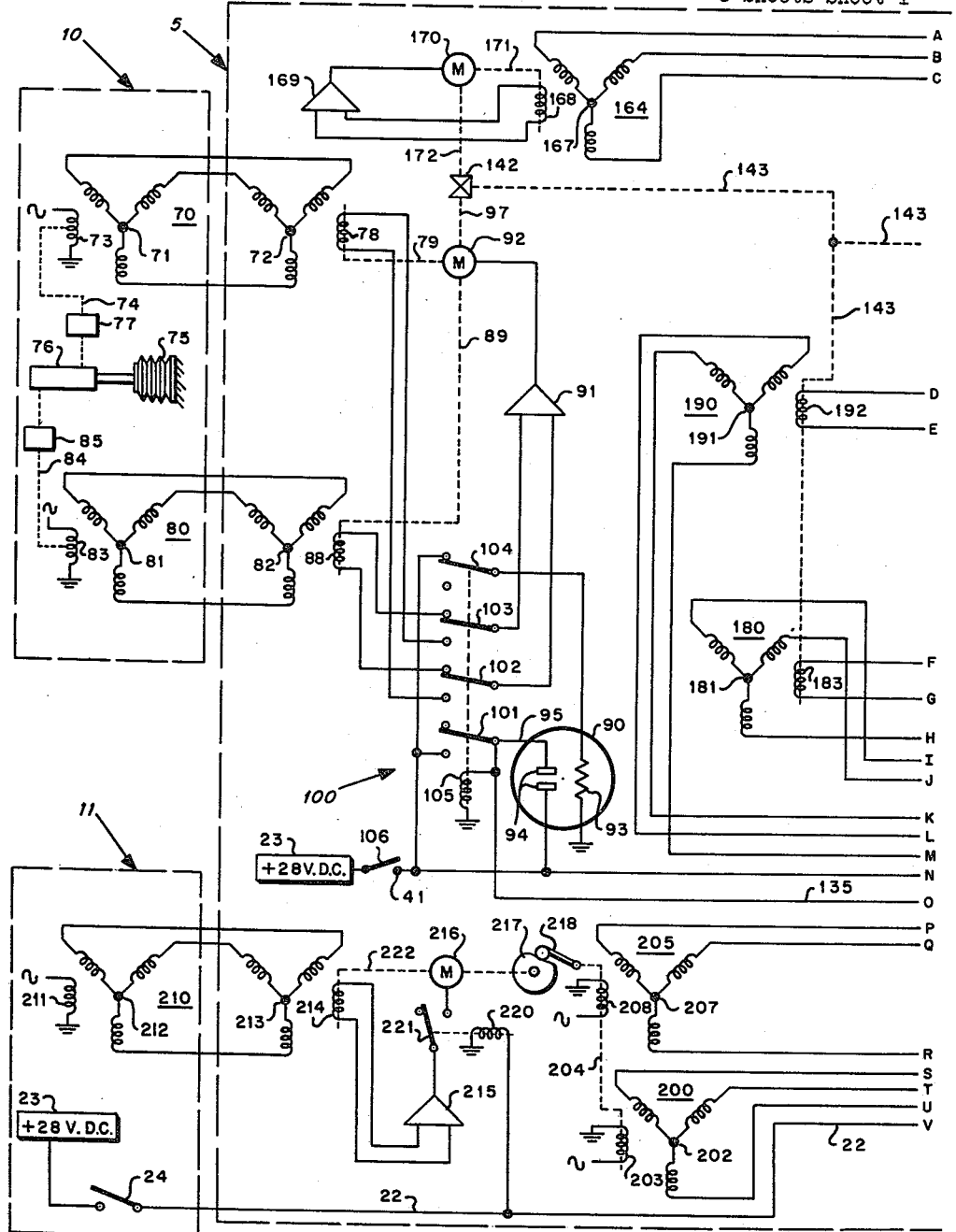

Dec. 24, 1963  S. J. SIKORA  3,115,628
BAROMETRIC-RADAR ALTITUDE INDICATING SYSTEM
Filed Dec. 21, 1959  3 Sheets-Sheet 1

INVENTOR
STEPHEN J. SIKORA
BY
AGENT

Dec. 24, 1963   S. J. SIKORA   3,115,628
BAROMETRIC-RADAR ALTITUDE INDICATING SYSTEM
Filed Dec. 21, 1959   3 Sheets-Sheet 2

INVENTOR
STEPHEN J. SIKORA

AGENT

INVENTOR
STEPHEN J. SIKORA
AGENT

United States Patent Office 3,115,628
Patented Dec. 24, 1963

3,115,628
BAROMETRIC-RADAR ALTITUDE INDICATING
SYSTEM
Stephen J. Sikora, Warminster, Pa., assignor to the United States of America as represented by the Secretary of the Navy
Filed Dec. 21, 1959, Ser. No. 861,155
5 Claims. (Cl. 343—12)
(Granted under Title 35, U.S. Code (1952), sec. 266)

The invention described herein may be manufactured and used by or for the Government of the United States of America for governmental purposes without the payment of any royalties thereon or therefor.

The invention relates to altitude indicators and more particularly to an altitude indicating system for use in an aircraft.

Prior art altitude indicating systems utilizing either barometers or radar terrain clearance sensors have several distinct disadvantages. Barometric altitude indicators are not accurate to more than a few hundred feet, are dangerous at low altitudes, and do not give actual altitude above terrain. On the other hand, radar has a tendency to very closely follow the terrain and thereby provides erratic information which makes the indicator hard to read in areas having uneven terrain. Also radar is not reliable when the aircraft is sharply banking, climbing or diving. Heretofore, each different type of altitude indicating system usually requires a separate indicating instrument, thus requiring more space on an already crowded instrument panel.

It is contemplated that the present invention will satisfactorily reconcile the characteristics of both the radar and barometric altitude indicating systems, thus bringing out the inherent advantages of each with none of the disadvantages being permitted to predominate.

It is a principal object of the invention, therefore, to provide a new altitude indicating system which has all of the advantages of both the individual radar and barometric altitude indicating systems.

Another object of the invention is the provision of a new altitude indicating system which has both a barometric and a radar altitude sensor with a selector switch for permitting either the barometeric or radar altitudes to be indicated in only one indicator.

Yet another object of the invention is the provision of a new altitude indicating system of the kind described adapted to obtain the difference between the radar and barometric altitudes and add the same to the barometric altitude sensed and display the sum in an altimeter, the advantage residing in the fact that if the radar portion of the system goes out, the barometeric altitude portion of the system continuously backs up the radar altitude portion of the system and accordingly, the barometric altitude information is instantly available at the indicator.

A still further object of the invention is a visual warning system which indicates in the indicator instrument when the radar portion of the system has failed or become unreliable.

A further object of the invention is the provision of a new barometric-radar altitude indicating system having a coarse barometric altitude input synchro arrangement of, for example, 117 degrees of shaft rotation for each 1000 feet of pressure altitude change and having a fine barometric altitude input synchro arrangement of, for example, 3.25 degrees of shaft rotation for each 1000 feet of pressure altitude change, means being provided for automatically alternately putting each synchro arrangement into the system so that not only is very accurate barometric altitude information made available but the accurate information is made available very quickly at the indicator.

The invention further resides in certain novel features of construction, combinations and arrangements of parts, and further objects and advantages of the invention will be apparent to those skilled in the art to which it pertains from the following description of the present preferred embodiment thereof described with reference to the accompanying composite drawing, which forms a part of this specification, and wherein the same reference characters represent corresponding parts throughout the several views.

Figure 1B:
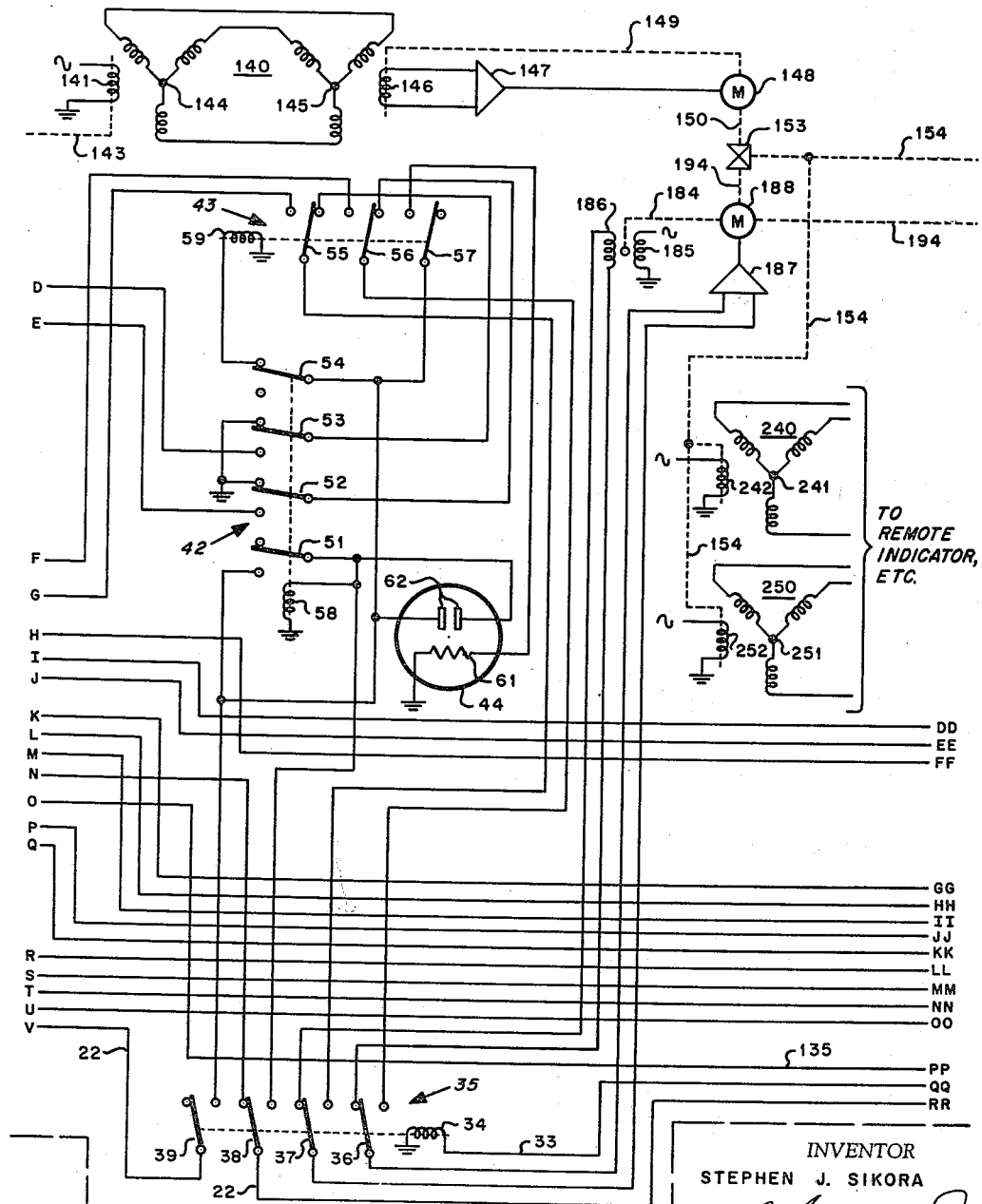
Figure 1C:
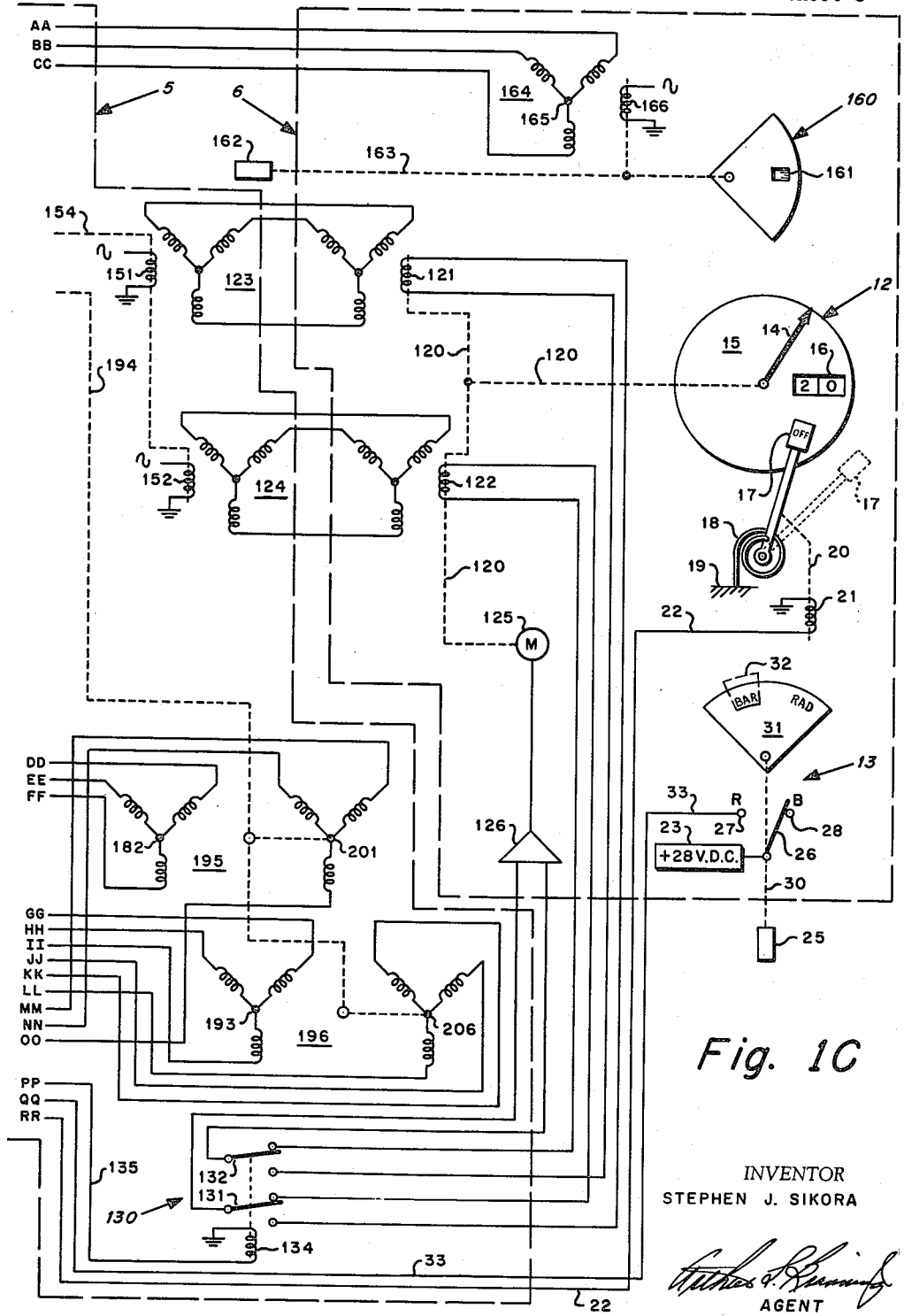

The drawing comprises three sheets designated as FIGS. 1A, 1B, and 1C, which show a schematic electromechanical diagram of an apparatus embodying the invention.

It is to be understood that the invention is not limited to the details of construction and arrangement of parts shown in the drawing and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to the drawing, the invention is disclosed as comprising a central control unit, indicated generally by the reference numeral 5 in FIGS. 1A, 1B, 1C, conveniently located in an aircraft having an instrument panel, indicated generally by the reference numeral 6 in FIG. 1C. Barometric altitude information is obtained by an air data computer and a radar unit, respectively indicated generally by the reference numerals 10 and 11 in FIG. 1A.

The altitude indicating system embodying the invention combines barometric information from a two-speed pickoff preferably in the air data computer 10, and radar altitude information from the radar altimeter 11, and displays the altitude information on a counter-pointer type indicator, indicated generally by the reference numeral 12 in FIG. 1C, with a manually-operated selector switch, indicated generally by the reference numeral 13 in FIG. 1C.

The indicator 12 has a pointer 14 wherein one revolution thereof relative to a dial 15 represents 1000 feet. A two digit counter 16 indicates thousands of feet. A radar reliability flag 17 is adapted to appear in front of and directly over the dial 15 when the radar 11 has been cut out of the circuit due to unreliability thereof. In addition to function and structural failure of the radar equipment, unreliability of the signal from the radar unit 11 may evolve during climbing, diving or banking at steep angles by the aircraft. During this period of time, the barometric information will indicate altitude changes from the last reliable radar reference in a manner to be explained in the description of the radar mode of operation of the invention. When the aircraft resumes a level flight attitude the radar information will correct the altitude indication if terrain clearance has changed during the interim maneuver.

A spiral torsion spring 18 fixed at one end to a frame 19 normally biases the flag 17 to the radar "Off" position. The flag 17 is biased to the right by an armature 20 of a solenoid when its grounded winding 21 is connected via a line 22 to a direct current aircraft power supply 23 of preferably 28 volts during reliable radar operation. A conventional radar reliability switch 24 controls the connection of the power source 23 to the flag solenoid winding and interrupts the circuit 22 when the radar unit 11 becomes unreliable, FIGS. 1A and 1C.

The BAR-RAD mode selector switch 13 has a manual control knob 25 adapted to close an electrical contact 26 with a RAD contact 27 or a BAR contact 28 via a shaft arrangement 30. In addition, the shaft 30 operates a sector 31 and turns the same to visually indicate whether the BAR or RAD modes have been selected. Specifically, when the RAD mode contact 27 has been closed by the switch 26, the inscription of "RAD" imprinted on the sector 31 will appear before a window 32. Conversely, when the BAR mode has been selected and the switch 26 has closed with the BAR contact 28, the term "BAR" inscribed on the pivotable sector 31 will appear before the window 32, FIG. 1C. The BAR contact 28 is a dummy contact but the RAD contact 27 is electrically connected by a line 33 to a grounded coil 34 of a BAR-RAD relay, indicated generally by the reference numeral 35. Accordingly, the relay 35 is energized upon the closure of the contact 27 with the switch 26, which is connected to the power supply 23. The relay 35 is provided with contacts 36, 37, 38, 39 which are normally mechanically biased to the position shown in FIG. 1B. The contact 38 normally connects the reliability flag relay coil 21 to the power supply 23 via a line 41 except when the BAR-RAD relay 35 is energized and then a pair of set-reset relays, indicated generally by the reference numerals 42, 43, and a times delay relay 44 control the connection of the relay 21 with the power source 23 via a radar reliability switch 24. The mechanically held relays 42 and 43 are respectively provided with normally open contacts 51, 52, 53, 54 and 55, 56, 57. Grounded coils 58 and 59 respectively control the closure of the contacts of the relays 42, 43.

When the RAD mode is selected, the contacts 38 and 39 of the BAR-RAD relay 35 are closed and electrical current flows from the power source 23 through the radar reliability switch 24 via line 22 through closed relay contact 39, relay contact 54, and energizes the grounded coil 59 of the set-reset relay 43. This causes the contacts of the relay 43 to close and permits electricity to flow through the closed contact 57 to the time delay relay 44 whereupon a grounded heating element or resistance 61 is energized. After a predetermined length of time, the heat of the element 61 causes a normally open switch 62 to close and put the coil 58 of the set-reset relay 42 into circuit and close the contacts 51, 52, 53, 54 thereof. The closing of the contact 54 cuts off the flow of electricity to the coil 59 and causes the relay 43 to be de-energized whereupon the contacts 55, 56, 57 thereof return to open position. Closure of the contact 51 permits electricity to flow through the closed contact 38 of the BAR-RAD relay 35 via line 22 to the radar reliability flag coil 21. As a result the flag 17 is pulled out of the altimeter window and out of view.

*Barometric Operational Mode*

Assuming that only the barometric altitude information is desired on the indicator 12, the selector knob 25 is switched to BAR mode. Altitude information is then obtained solely from the air data computer 10 which provides barometric altitude information in the form of a two-speed synchro output system. The electrical angles generated are proportional to barometric altitude. One synchro system, indicated generally by the reference numeral 80, is calibrated to provide a shaft rotation of 117 degrees per 1000 feet of altitude change for coarse but fast altitude adjustment while a second synchro system, indicated generally by the reference numeral 70, is calibrated to provide a more accurate shaft rotation of 3.25 degrees per 1000 feet of altitude change. A time delay relay 90 is adapted to put the two synchro systems 70 and 80 into circuit with the use of an air data reference relay, indicated generally by the reference numeral 100, so that a shaft angle is provided that is respectively provided with a coarse and fine altitude indicating signal. This unique arrangement permits a very quick and accurate barometric altitude indication to be initially provided at the indicator 12.

More particularly, the synchro system 80 provides the initial signal to the indicator 12 and comprises two control transformers having a pair of Y-shaped stator windings 81, 82 connected back-to-back with the winding 81 having an electrical signal inducted therein from an energized grounded primary coil 83 adapted to be rotated proportional to the altitude by a shaft 84. The shaft 84 is geared to rotate 117 degrees for each 1000 feet of altitude change sensed by a pressure bellows type of barometer 75. Specifically, the bellows 75 expands or retracts with altitude change and transmits movement via a mechanical motion converter 76, which may comprise a rack and gear arrangement, and a gear box 85 to the rotor shaft 84. The converter 76 converts linear motion to angular motion in a known conventional manner and the gear box 85 has a gear ratio suitable for providing the shaft 84 with the specified 117 degrees of rotation per thousand feet of altitude change. Accordingly, the output of the synchro system 80 is picked off by a transformer secondary rotor coil 88 having a shaft linkage 89.

Similarly, the operational fine altitude synchro system 70, which takes over after the system 80 has been put out of circuit, comprises two control transformers having a pair of Y-shaped stator windings 71 and 72 connected back-to-back. A grounded input rotor coil 73 is energized by a rated power supply and is rotated by a shaft 74. The drive for the shaft 74 is provided by the bellows 75, the motion converter 76, and a gear box 77, the latter having a gear ratio suitable for providing the shaft 74 with 3.25 degrees of angular movement per thousand feet of altitude change during the balance of the aircraft's mission. The signal transferred to the stator or primary winding 72 is adapted to be picked off by a rotor coil or secondary 78 driven by a mechanical shaft linkage 79.

The signals from both of the synchro systems 70 and 80 are respectively picked off by the output coils or secondaries 78, 88 and selectively conducted to an amplifier 91, which has an output driving a synchronous motor 92. The switching of the system 70 into circuit is effected by the energization of the air data reference relay 100 upon the energization of the normally open time delay relay 90. Nulling of the inputs to the coils 73, 83 is effected by the motor 92 repositioning the shafts 79 and 89, respectively. The air data reference relay 100 has normally open contacts 101, 102, 103, 104 adapted to be closed by a common armature upon the energization of a grounded solenoid coil 105. Contacts 102 and 103 in open position connect the system 80 to the amplifier 91 and in the closed position connect the system 70 to the amplifier 91.

Assuming the coil 105 of the relay 100 to be unenergized as shown in FIG. 1A, electricity from the aircraft power supply 23 is connected, via a switch 106, line 41 and contact 104, to a grounded heating element or resistance 93 in the time delay relay 90. After a predetermined length of time, normally open contacts 94 of the time delay relay 90 close and connect the coil 105 of the relay 100 to the power supply 23 via line 95 causing closure of the relay contacts 101, 102, 103, 104. Relay hold contact 101 then directly connects the relay coil 105 to the line 41, bypassing the contact 104 and the relay 90.

At this time, contacts 102 and 103 connect the rotor coil 78 of the system 70 to the input side of the amplifier 91, and the amplifier drives the motor 92, and the motor 92 drives the rotor 78 via linkage 79 to a null position. As soon as the heating element 93 of the relay 90 cools off, the contacts 94 open.

When either of the outputs of the systems 70 and 80 are put into circuit, the motor 92 angularly adjusts an output shaft 97 proportional to the altitude indicated by the barometer 75 in the manner described.

The altitude information from the shaft 97 in the unit 5 is transferred to the altitude indicator 12 in the instrument panel 6 in the following manner. Referring to FIG.

1C, a mechanical linkage 120 drives the pointer 14, counter 16, and synchro output rotor coils 121, 122, which are secondaries of a control transformer of repeater synchro systems respectively indicated by the reference numerals 123, 124. The linkage 120 is driven by a synchro motor 125 which is connected to the output side of an amplifier 126. The input to the amplifier 126 is taken from either the coarse synchro system 124 or the fine synchro system 123 as controlled by a pointer-counter relay, indicated generally by the reference numeral 130 and having normally open contacts 131, 132 adapted to be closed by the energization of a grounded solenoid coil 134.

The coil 134 is connected via line 135 to line 95 which is controlled by the contacts 94 of the relay 90. Accordingly when the relay 100 is deenergized, the relay 130 is deenergized. It follows then that when the coarse synchro system 80 is connected to drive the shaft arrangement 97, the coarse synchro system 124 has its output rotor coil 122 connected via contacts 131, 132 to the input of the amplifier 126 for driving the linkage 120 of the indicator 12.

Similarly, when the relay 100 is energized, the relay 130 is also energized and both fine altitude synchro systems 70 and 123 are put into circuit, so that fine altitude information is substantialy continuously available on the indicator 12 at all times after the initial input from the coarse synchro systems 80 and 124.

A second fine repeater synchro system 140, comprised of two synchros, is preferably provided in the central control unit 5 wherein a grounded input rotor or primary coil 141, forming the primary of one synchro, is driven by the shaft 97 via a mechanical differential 142 and a rotor shaft 143. The signal from the coil 141 is conveyed via a pair of Y-shaped back-to-back stator or transformer windings 144, 145 to an output or secondary rotor coil 146 which feeds the signal to an amplifier 147. The output of the amplifier 147 drives a synchro motor 148 which has a shaft arrangement 149 adapted to drive the output rotor 146 to a null position and another output shaft 150 adapted to convey the fine altitude information to grounded input rotor or primary coils 152, 151 of the coarse and fine repeater synchro systems 124, 123, respectively, via a mechanical differential 153 and a shaft arrangement 154.

As pointed out, only one of the coarse and fine synchro systems 80 and 70 are operating at one time, the system 80 makes the initial adjustment and then the fine system 70 takes over until the relay 100 is deenergized by the switch 106. Accordingly, only one shaft arrangement 154 is necessary to control the input signals to the repeater synchro systems 123, 124. It is understood that the grounded input coils, such as the coils 73, 83, 141, 151 and 152 are each energized from a suitable rated energized source.

Bar Mode Calibration

It is necessary that a means be provided for adjusting the calibration, often referred to as the altitude setting, of the barometric altitude indicator so that the atmospheric pressure can be suitably converted to usable terrain clearance information.

Accordingly, a barometer scale adjustment device 160, FIG. 1C, has a vernier scale 161, which preferably reads in inches of mercury, that is adjustable by a knob 162 via a shaft 163. A synchro system 164 comprised of two synchros is adapted to transmit the adjustment of the barometer scale 161. One control transformer 164 has a secondary winding 165 adapted to receive an electrical signal from a grounded, suitably energized primary rotor coil 166 upon the adjustment of the shaft 163. The signal is transmitted to a primary winding 167 of the other control transformer, which winding 167 is Y-shaped and connected back-to-back with the similarly shaped winding 165. A secondary or pickoff coil 168 transmits the signal to an amplifier 169 and drives a synchronous motor 170. The motor 170 then adjusts a shaft linkage 171 to drive the rotor coil 168 to a null position. Simultaneously therewith, the motor 170 adjusts the angular position of the shaft linkage 143 via a shaft linkage 172 and the mechanical differential 142 so that the indicator 12 is suitably calibrated to provide a terrain clearance readout from a given geographical elevation at current barometric conditions.

RAD Mode Operation

A novel feature of the invention resides in the manner in which the altitude indicating system will provide radar altitude information that is representative of actual terrain clearance but which automatically backs up the radar information with barometric altitude information and makes the same available in the event that the radar becomes unreliable.

The above is accomplished by electromechanically obtaining the algebraic difference between the radar and barometric altitudes and algebraically adding this difference to the barometric altitude information. This can be expressed by the following equation:

(1) $$Ba + (Ra - Ba) = H$$

where:

$H$ = indicated altitude
$Ba$ = barometric altitude
$Ra$ = radar altitude

Analysis of the foregoing will show that when the RAD mode is being employed, the altitude obtained is the actual terrain clearance or radar altitude unless the expression of $(Ra - Ba)$ is deleted and then the value of $H$ is equal to the barometric altitude.

The foregoing is implemented by providing a signal linearly proportional to altitude difference between the radar and barometric altitudes in a shaft linkage 194 at the mechanical differential 153 which drives the input shaft linkage 154 of the repeater synchro systems 123, 124. The linkage 194 is driven by a synchro motor 188 in such a direction relative to the shaft linkage 150 that the mechanical differential 153 adds the respective signal inputs of the linkages 150 and 194. The sum of the two signals is represented by the angular position of the shaft 154.

The motor 188 is driven by the output of an amplifier 187 which is adapted to have the input side thereof initially connected to a pickoff rotor coil 183 of a coarse synchro 180, which is a control transformer having a Y-shaped stator or primary winding 181. The coarse synchro 180 is then switched out of circuit in a manner to be described and then a fine synchro or control transformer 190 is switched into circuit so that a Y-shaped stator winding 191 supplies a signal to a pickoff rotor coil or secondary 192. In either instance the secondaries or rotor coils 183, 192 are angularly positioned in accordance with the current barometric altitude information by the shaft linkage 143. Therefore, the electrical signals in the pickoff coils 183, 192 are respectively representative of the current coarse and fine values of $Ra - Ba$, the difference between radar and barometric altitude change.

The synchro 180 is a part of a coarse radar synchro chain, which further comprises a differential synchro 195 having a Y-shaped stator winding 182 and a Y-shaped rotor coil 201, positioned by the motor drive linkage 194, and a synchro transmitter 200 having a Y-shaped secondary winding and an input rotor coil 203 adapted to be adjusted by a rotor shaft 204. The windings 181, 182 are Y-shaped and connected back-to-back as are the windings 201, 202.

Similarly a fine radar synchro chain is comprised of the control transformer 190, a differential synchro 196, and a transmitter 205. The control transformer comprises a Y-shaped primary or stator 191 and the output coil 192 positioned by the barometer positioned linkage 143. The fine differential synchro 196 comprises a Y-shaped secondary or stator 193 connected back-to-back with the primary 191 and a Y-shaped primary or rotor winding 206 angularly positioned by the linkage 194, which also positions the winding 201 of the coarse differential synchro 195. The transmitter 205 has a Y-shaped secondary stator winding 207 adapted to transmit a signal from an input coil 208, which is angularly positioned by the same shaft 204 that positions the rotor coil 203 of the radar transmitter 200. Y-shaped windings 206 and 207 are connected back-to-back.

It is to be understood that the Y-shaped windings throughout the invention may be delta-shaped if desired.

In order that the RAD system synchro motor 188 is properly nulled and ready when selected, a linear transformer is provided having a primary winding 185 and an output winding 186 adapted to be positioned by a shaft 184. The motor 188 drives the shaft 184. The primary winding 185 is suitably energized from a rated power supply.

Assuming that the mode selector switch 26 is still closed with BAR contact 28 and the coil 34 of the BAR-RAD relay 35 is not energized, the contacts 36, 37, 38, 39 are open as shown in FIG. 1B and the secondary winding 186 of the linear transformer is connected via the contacts 36, 37 to the input side of an amplifier 187, which drives synchronous motor 188. The motor 188 drives the shaft 184 of the linear transformer secondary coil to a null position, if the linear transformer is not already nulled. It is readily apparent that the transformer will always be nulled when the BAR mode is being utilized and thereby prepared for the RAD mode of operation when selected.

Simultaneously therewith the motor 188 drives the shaft linkage 194 to an angular position proportional to the difference between the radar altitude and the barometric altitude. This difference is then added to the linkage 154 via the mechanical differential 153. Since the BAR mode is in effect, the motor 188 will not again be energized once the shaft 184 drives the secondary 186 to a null position.

However, upon moving the RAD mode selector knob 25 from BAR mode to RAD mode position and closing the switch 26 with the contact 27, the relay coil 34 is energized and the contacts 36, 37, 38, 39 are closed. The closing of the contact 39 puts the coil 59 of the relay 43 into circuit with the power supply 23 via contact 54, line 22 and the switch 24. Accordingly, the relay 43 is energized and the contacts 55, 56, 57 are closed.

Simultaneous with the closing of the contacts 36, 37 of the BAR-RAD relay 35, the input leads of the amplifier 187 are connected to ground via open contacts 56, 52 and 55, 53 during the instant after the contacts of the relay 35 have closed but before the contacts of the relay 43 are closed. The closing of the contacts 55, 56 puts the rotor coil 183 of the control transformer of the coarse radar synchro system 180 into circuit for fast adjustment thereof and readout on the indicator 12. The radar signal output of the stator or primary winding 181 is modified by the positioning of the shaft 143 and thereby provides an electrical signal to the amplifier 187 proportional to the difference between the radar and barometric altitudes. The output of the amplifier 187 is nulled in the manner hereinbefore described and the input to the shaft 154 to the indicator 12 is the coarse radar altitude backed up by the coarse barometric altitude. The shaft 143 is positioned according to the barometric altitude and, as pointed out, the signal in the output coil 183 is proportional to the difference between the two coarse altitudes.

The coarse radar altitude signal in the stator winding 181 is obtained from the transmitter 200 via the windings 201, 182 of the differential synchro 195.

The radar signal is transmitted to a synchro system 210 from an input coil 211 to stator windings 212, 213, which are connected back-to-back, the input rotor coil 211 being suitably energized with a signal representative of change in terrain clearance. A suitable rotor shaft, not shown, can be used to control the input signal.

A secondary winding or output rotor coil 214 picks off the signal from the winding 213 and supplies the same to the input side of an amplifier 215, which drives a synchronous motor 216. The motor 216 then positions a linear function cam 217, which may be referred to as a compensating cam, for converting the nonlinear signal from the radar unit 11 to a linear signal compatible with the linear barometer signal. A cam follower 218 transfers the motion of the cam to the rotor shaft 204. The reason for the necessity of the cam 218 is that the barometric and radar signals must be continuously compared to obtain the algebraic difference therebetween. The barometric output signal is linear through its entire range while the radar output signal is nonlinear. If desired a nonlinear potentiometer can be used in place of the preferred cam 218 for converting the signal output of the amplifier 215 to the motor 216.

The motor 216 nulls the signal in the rotor coil 214 via a shaft 222. Also it will be noted that the radar unit is not put into circuit until a grounded relay coil 220 closes a switch 221 which controls the flow of electricity to the motor 216 from the amplifier 215, the relay 220 being controlled by reliability switch 24 in the radar unit 11.

The coarse altitude signal proportional to $Ra-Ba$ is provided in the manner described to the differential 153. The fine altitude signal is supplied a predetermined length of time thereafter, as determined by the relay 44, after the relay 43 has been energized and the contacts thereof closed. The closure of the relay contact 57 immediately puts the grounded heating element 61 of the time delay relay 44 into circuit and after the predetermined length of time the contacts 62 thereof close and put coil 58 of the reset relay 42 into circuit with the power supply 23 via the closed contact 39. Closure of the hold contact 51 of the relay 42 will then maintain the coil 58 energized until the line 22 is again broken by deenergizing the BAR-RAD relay 35. At the same time closure of the contact 54 will take the relay coil 59 out of circuit and the contacts of the relay 43 are permitted to be mechanically biased to the normal position shown in FIG. 1B.

Additionally, the energization of the reset relay 42 closes contacts 52, 53 and puts the output coil or secondary winding 192 into circuit with the amplifier 187 via contacts 52, 56, 36 and 53, 55, 37 of the reset relay 42, the set relay 43 and the BAR-RAD relay 35, respectively.

An additional feature of the invention is that a means is illustrated for teaching how an additional altitude indicator, similar to indicator 12, can be connected into the system. For example, coarse and fine altitude signals can be respectively transmitted by control transformers 240, 250, which have Y-shaped stator secondary windings 241, 251 adapted to respectively receive a signal from grounded primary or input rotor coils 242, 252. The coils 242, 252 are energized from a suitable power source and are angularly adjusted by the shaft 154 to a position representative of the altitude signal conveyed by the altitude indicating system.

It will be understood that the present invention may be modified to adapt it to various circumstances and conditions, and it is accordingly desired to comprehend within the purview of this invention such modifications as may be considered to fall within the scope of the appended claims.

What is claimed is:

1. An altitude indicating system, comprising in combination: barometric means providing first and second outputs proportional to coarse and fine altitudes, respectively, radar means providing first and second outputs linearly proportional to coarse and fine terrain clearances, respectively, subtractor means connected to said barometric means and said radar means providing a first output proportional to the difference between said first outputs of said radar means and said barometric means and second output proportional to the difference between said second outputs of said radar means and said barometric means, differential means connected to said barometric means and said subtractor means providing a first output proportional to the sum of said first output from said barometric means and said first output from said subtractor means and a second output proportional to the sum of said second output from said barometric means and said second output from said subtractor means, altitude indicator means, switch means connected between said differential means and said altitude indicator means coupling said first output from said differential means to said altitude indicator means, time delay means coupled to said switch means for coupling said second output from said differential means to said altitude indicator means after a predetermined time.

2. An altitude indicating system, comprising in combination: barometric means providing a first signal coarsely proportional to altitude and a second signal finely proportional to altitude, first motor means, first switch means operatively connected between said barometric means and said first motor means, said first switch means transmitting said first altitude signal to said first motor means when in a first position and transmitting said second altitude signal to said first motor means when in a second position whereby said first motor means has an output coarsely proportional to altitude or finely proportional to altitude, radar means providing a first signal coarsely proportional to terrain clearance and a second signal finely proportional to terrain clearance, second motor means, second switch means operatively connected to said radar means and said said second motor means transmitting said first terrain clearance signal to said second motor means when in a first position and transmitting said second terrain clearance signal to said second motor means when in a second position time delay means coupled to said first and second switch means automatically changing each of said switch means from said first position to said second position after each of said switch means have been in said first position a predetermined time, connecting means coupling said output of said first motor means as an input to said second motor means, said second motor means having an output proportional to the difference between said terrain clearance signal and said altitude signal, differential means connected to said first and second motor means having an output proportional to the algebraic sum of said outputs of said first and second motor means, indicating means connected to said differential means visually displaying said differential output as altitude information.

3. The system of claim 2 wherein: said second motor means further comprises first means for reducing said output of said second motor means to zero when said radar means is inoperative and second means for holding said output of said second motor means constant when said radar means is unreliable.

4. An altitude indicating system, comprising in combination: barometric means providing a signal proportional to altitude, first synchro means connected to said barometric means providing an output coarsely proportional to altitude, second synchro means connected to said barometric means providing an output finely proportional to altitude, first synchro motor means having an output shaft, first switch means having a first position connecting said first synchro means to said first synchro motor means and a second position connecting said second synchro means to said first synchro motor means whereby said first synchro motor means has an output coarsely or finely proportional to altitude, radar means providing a signal linearly proportional to terrain clearance, third synchro means connected to said radar means providing an output coarsely proportional to terrain clearance, fourth synchro means connected to said radar means providing an output finely proportional to terrain clearance, first means connecting said output shaft of first synchro motor means to said third and fourth synchro means, each of said third and fourth synchro means including summing means to subtract said coarse or fine outputs proportional to barometric altitude from said coarse or fine outputs proportional to terrain clearance respectively, second synchro motor means having an output shaft, second switch means having a first position connecting said third synchro means to said second synchro motor means and a second position connecting said fourth synchro means to said second synchro motor means whereby said second synchro motor means has an output coarsely or finely proportional to terrain clearance minus the barometric altitude, time delay means coupled to said first and second switch means automatically changing said first and second switch means from said first position respectively after a predetermined time delay, differential summing means connected to said output shafts of said first synchro motor means and said second synchro means having an output proportional to the sum of said output of said first synchro motor means and said output of said second synchro motor means, indicator means connected to said differential output for visually displaying a coarse indication of altitude when said first and second switch means are in said first position and a fine indication of altitude when said first and second switch means are in said second position.

5. In an altitude indicating system for an aircraft, a barometer sensitive to altitude, a coarse barometric altitude synchro system having a transmitter synchro with an input rotor, first means actuated by said barometer for driving said coarse input rotor for transmitting at one rate the barometrically sensed altitude, a fine barometric altitude synchro system having a transmitter with an input rotor, second means actuated by said barometer for driving said fine input rotor for transmitting at a second rate the barometrically sensed altitude for the purpose of increased accuracy, said second rate being relatively slow with respect to said first rate, said coarse barometric altitude synchro system having a control transformer receiving coarse barometric altitude information from said coarse barometric altitude transmitter and having an output coil, said fine barometric altitude synchro system having a control transformer receiving fine barometric altitude information from said fine barometric altitude transmitter and having an output coil, an amplifier, a servo motor connected to the output of said amplifier, shaft means driven by said servo motor connected to rotate said output coils of said fine and coarse barometric altitude control transformers, relay means having a grounded coil and first, second, third and fourth normally open contacts, time delay relay means having a grounded heating element and a pair of normally open contacts closable a predetermined time after said heating element is energized by electricity conducted to said heating element via said fourth contact of said relay means, first servo loop means connecting said coarse output rotor coil to said amplifier via said second and third contacts of said relay means when the latter is unenergized, and second servo loop means connecting said fine output rotor coil to said amplifier via said second and third contacts of said relay means when the latter is energized, first electrical conduit means connecting one of said time delay contacts to said grounded relay coil of said relay means, second electrical conduit means adapted to connect said second contact of said time delay contacts to an electrical power supply of the aircraft, said grounded relay coil of said relay means being energized upon the closing of said contacts of said time delay relay means, said first, second, third, and fourth contacts of said relay means being closed upon said relay means being energized, said shaft means driven by said servo motor being operatively connected to an altitude indicating means, the closure of said fourth and first contacts of said relay means respectively disconnecting said heating element of said time delay relay means from said electrical power supply and connecting said relay coil of said relay means to said power supply and simultaneously therewith disconnecting said output coil of said coarse synchro system from said amplifier and connecting said output coil of said fine synchro system to said amplifier upon the closure of said second and third contacts when said relay coil of said relay means is energized.

References Cited in the file of this patent

UNITED STATES PATENTS

| | | |
|---|---|---|
| 2,809,340 | Bernhart | Oct. 8, 1957 |
| 2,841,345 | Halpert et al. | July 1, 1958 |
| 2,847,855 | Berger | Aug. 19, 1958 |
| 2,930,035 | Altekruse | Mar. 22, 1960 |